(12) United States Patent
Adolf et al.

(10) Patent No.: US 7,915,771 B2
(45) Date of Patent: Mar. 29, 2011

(54) SALIENT-POLE MACHINE COMPRISING AT LEAST ONE FIELD COIL

(75) Inventors: Haiko Adolf, Erfurt (DE); Günther Hautke, Stottemheim (DE); Jens Möbius, Bienstädt (DE)

(73) Assignee: Siemens Aktiengesellschaft, Munich (DE)

( * ) Notice: Subject to any disclaimer, the term of this patent is extended or adjusted under 35 U.S.C. 154(b) by 742 days.

(21) Appl. No.: 10/589,176

(22) PCT Filed: Feb. 1, 2005

(86) PCT No.: PCT/EP2005/000994
§ 371 (c)(1),
(2), (4) Date: May 24, 2007

(87) PCT Pub. No.: WO2005/078898
PCT Pub. Date: Aug. 25, 2005

(65) Prior Publication Data
US 2007/0278888 A1   Dec. 6, 2007

(30) Foreign Application Priority Data
Feb. 12, 2004 (EP) .................................. 04003171

(51) Int. Cl.
*H02K 9/00* (2006.01)
*H02K 23/04* (2006.01)
*H02K 21/38* (2006.01)
*H02K 21/26* (2006.01)
*H02K 1/00* (2006.01)
*H02K 1/24* (2006.01)

(52) U.S. Cl. ................ 310/55; 310/156.49; 310/156.57; 310/184; 310/269

(58) Field of Classification Search ................. 310/184, 310/269, 156.49, 156.57, 156.63, 55
See application file for complete search history.

(56) References Cited

U.S. PATENT DOCUMENTS
6,741,152 B1 * 5/2004 Arz et al. ...................... 335/300
2004/0163879 A1 * 8/2004 Segawa ......................... 180/444

FOREIGN PATENT DOCUMENTS
| DE | 198 10 628 A1 | 9/1999 |
|---|---|---|
| EP | 0 008 250 A1 | 2/1980 |
| EP | 0 052 383 A1 | 5/1982 |
| EP | 0 415 057 A1 | 3/1991 |
| FR | 2 180 658 | 11/1973 |
| JP | 59169348 A | 9/1984 |
| JP | 02299438 A | 12/1990 |
| JP | 03143239 A | 6/1991 |
| JP | 11069681 A * | 3/1999 |
| JP | 2002058188 A * | 2/2002 |
| JP | 2002058188 A1 | 2/2002 |

OTHER PUBLICATIONS
Machine Translation JP11069681 (1999).*
Machine Translation JP2002058188 (2002).*
* cited by examiner

*Primary Examiner* — Quyen Leung
*Assistant Examiner* — Jose A Gonzalez Quinones

(57) ABSTRACT

The invention relates to a salient-pole machine comprising at least one field coil that extends in an axial direction of the salient-pole machine and is located below a pole shoe on a rotor body. Said machine is characterized in that the field coil is pressed against the pole shoe by means of at least one spring that is provided between the field coil and the rotor body and that an axial cooling channel is created in the gap between the field coil and the rotor body that is formed by the spring. The spring is configured in particular as a bent plate spring.

4 Claims, 2 Drawing Sheets

SALIENT-POLE MACHINE COMPRISING AT LEAST ONE FIELD COIL

CROSS REFERENCE TO RELATED APPLICATIONS

This application is the US National Stage of International Application No. PCT/EP2005/000994, filed Feb. 1, 2005 and claims the benefit thereof. The International Application claims the benefits of European Patent application No. 04003171.8 filed Feb. 12, 2004. All of the applications are incorporated by reference herein in their entirety.

FIELD OF THE INVENTION

The invention relates to a salient-pole machine comprising at least one field coil, which extends in an axial direction of the salient-pole machine and is arranged on a rotor body beneath a pole shoe.

BACKGROUND OF THE INVENTION

In the case of salient-pole machines, such as salient-pole generators, the cooling of the field winding of an associated salient-pole rotor often presents considerable technical difficulties. Whilst a whole series of technically unobjectionable and functional proposals already exists for passing cooling air into pole gaps in the salient-pole rotor, the previously known measures for field coil cooling, i.e. the dissipation of the heat in order to limit the temperature of the field coils of salient-pole machines, have until now been largely unsatisfactory. For example, EP 0 415 057 B1 describes an arrangement for the forced supply of a cooling medium into a gap between a pole core of the rotor body and the field coil, in which a guiding device is provided in the gap between the pole core and the field coil which splits the gap into two areas which are freely connected essentially only at that end of the gap which is on the pole-cap side and otherwise have a flow passing through them successively. Such a guiding device is comparatively complex in terms of manufacturing, however, and requires special, correspondingly adapted fitting.

DE 198 10 628 A1 discloses a ventilation system for the field winding or field coil of large salient-pole machines, in which flow paths are also formed at the top of flat copper conductors of the field coil parallel to the flow path in the pole gap. The parallel flow paths thus formed pass through all the flat copper conductors and the associated insulating layers. However, the flow paths weaken the field coils and, under certain circumstances, do not result in the expected cooling performance.

SUMMARY OF THE INVENTION

The invention is based on the object of improving a salient-pole machine of the type mentioned initially such that the field coils arranged on the rotor body are cooled more effectively in a comparatively cost-effective manner.

The object is achieved according to the invention by a generic salient-pole machine, in which the field coil is forced against the pole shoe by means of at least one spring, which is arranged between the field coil and the rotor body, and an axial cooling channel is created by the gap produced by the spring between the field coil and the rotor body. The object is also achieved by a salient-pole machine, in which the field coil is forced against the pole shoe by means of at least one spring, which is arranged between the field coil and the rotor body and is in the form of a leaf spring.

Owing to the fact that, according to the invention, the field coil is supported by one or more springs arranged beneath the field coil, according to the invention at the same time an axial cooling channel is created, through which cooling medium can be supplied to the field coils. This type of cooling of field coils according to the invention does not require any additional guiding device and is therefore comparatively cost-effective in terms of manufacturing and fitting. Owing to the fact that, according to the invention, the field coil is supported by one or more leaf springs arranged beneath the field coil, cross sections can be created which have a comparatively low flow resistance. The areas created according to the invention can therefore be used particularly well for axial guidance of cooling medium beneath the field coil.

In one advantageous development of the salient-pole machine according to the invention, the spring provided between the field coil and the rotor body is formed with at least one essentially U-shaped section, and the field coil is forced against the associated pole shoe by one of the two limbs of this essentially U-shaped section. The area in the interior of the U-shaped section is then used as a passage for forming the axial cooling channel according to the invention.

Furthermore, a spring is advantageously provided with two essentially U-shaped sections which partially overlap one another and together form essentially an O shape, which is open at one point. Such an "annular" spring can, given a corresponding design in the radial direction, apply a high spring force and nevertheless makes available a comparatively large through-opening as the cooling channel in its interior.

In addition, two field coils can be forced against in each case one associated pole shoe by such an O-shaped spring, with the result that, overall, only comparatively few springs need to be used on such a salient-pole machine according to the invention. The O-shaped springs used should in the process be arranged with their opening such that these openings point towards a coil support arranged between the two field coils.

Furthermore, the O-shaped spring should be fixed to the rotor body using at least one fixing means on that side of the O shape which is opposite the opening in the O shape. The spring is then held securely on the rotor body, while its two essentially semi-cylindrical spring arms each force one of two field coils against the associated pole shoe.

The spring stiffness of the spring provided according to the invention should advantageously be between approximately 1 and 4 N/mm, in particular between approximately 2 and 3 N/mm. For example, a required field coil tolerance or winding height tolerance of +/−2 mm can be compensated for by such a spring. In order to achieve the required spring stiffness, two leaf springs can also be inserted one inside the other or used one next to the other. The surface load between the spring and the field coil or an insulating element arranged there (for example, a glass-fiber reinforced plastic part) should be within the limits of approximately 20-30 N/mm$^2$.

As regards the design of the spring according to the invention, it is finally also advantageous if the spring is formed such that, in the stressed state, its bearing point or region on the associated field coil or on an insulating element arranged there is at a slight distance from the axis of gravity of the field coil. The distance between the axis of gravity and the bearing point should in particular be between 2 and 5 mm, most preferably 3.5 mm. Such a slight displacement of the bearing point of the spring according to the invention advantageously particularly results in a greater spring excursion and a flatter profile for the spring force.

In order to optimize the improved cooling of the field coils of a salient-pole machine according to the invention, at least one cooling channel should be formed in the at least one field coil, which cooling channel points essentially radially and by means of which cooling channel a fluid-conducting connection is produced between the mentioned axial cooling channel and the outside of the pole shoe.

BRIEF DESCRIPTION OF THE DRAWINGS

One exemplary embodiment of a salient-pole machine according to the invention will be explained in more detail below with reference to the attached schematic drawings, in which.

DETAILED DESCRIPTION OF THE INVENTION

Figure 1:
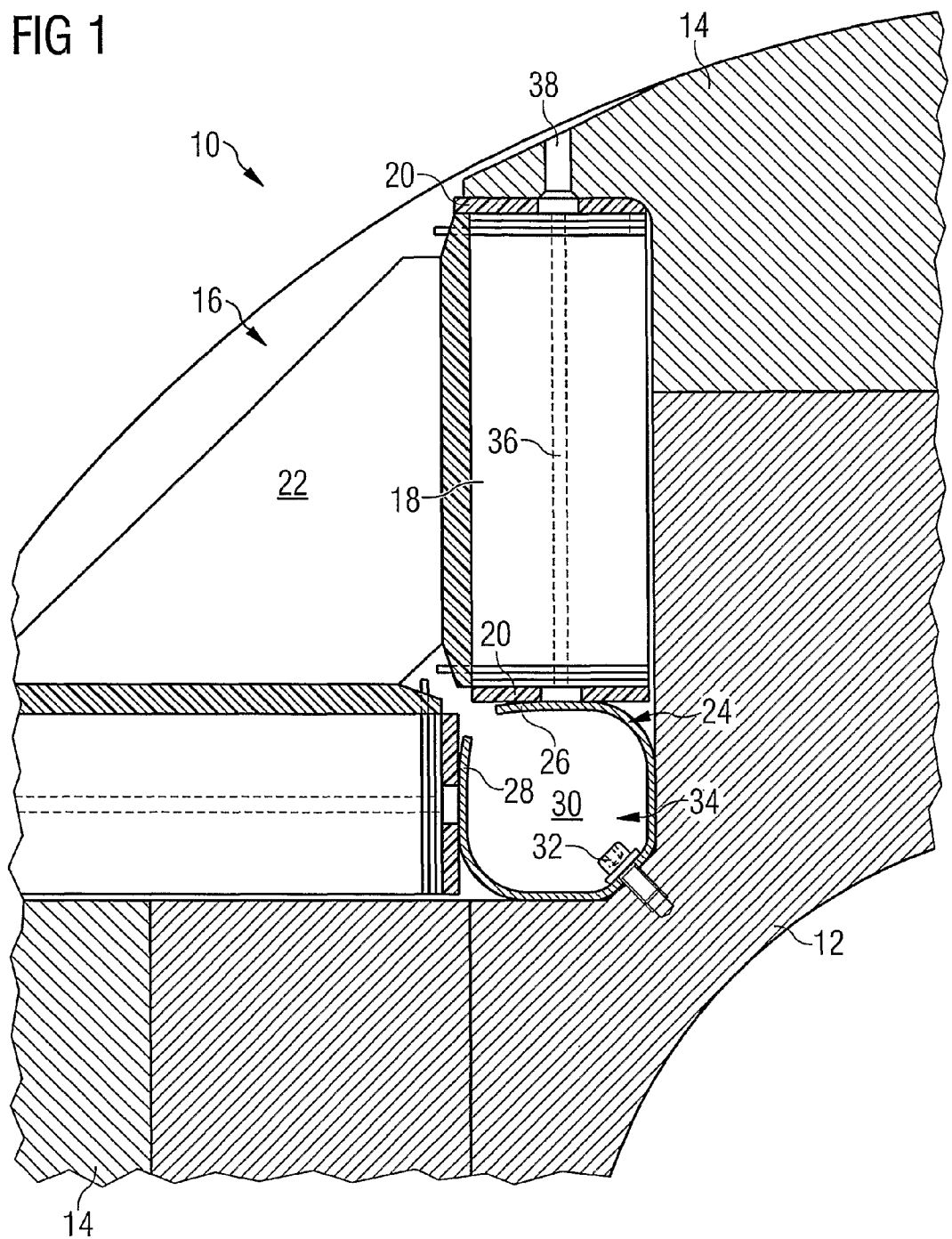
FIG. 1 shows a partial cross section through a salient-pole rotor of one exemplary embodiment of a salient-pole machine according to the invention.
Figure 2:
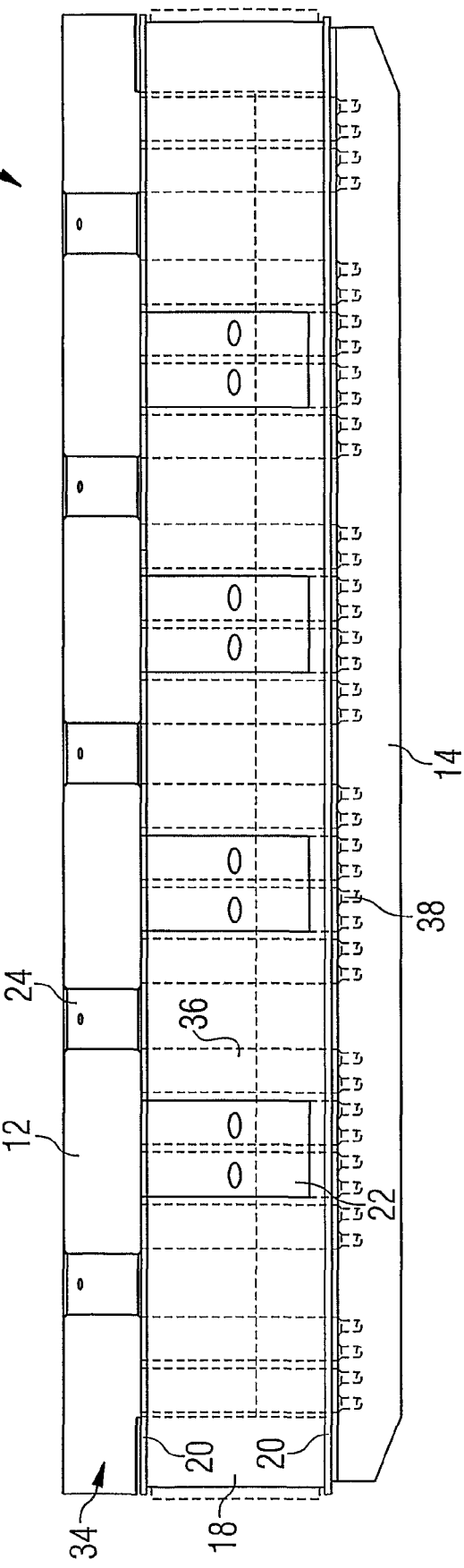
FIG. 2 shows a longitudinal section through the salient-pole rotor shown in FIG. 1.

FIG. 1 shows an essentially cylindrical salient-pole rotor 10 of a salient-pole generator, which has a rotor body 12 and elongate pole shoes 14 arranged on the outside of said rotor body 12. A cutout 16 is formed between in each case two elongate pole shoes 14, which cutout 16 is essentially triangular in cross section and likewise extends over the entire length of the rotor body 12 in the form of a groove.

In each case two field coils 18, which extend in the axial direction of the salient-pole rotor 10 and are each embedded in an insulating frame 20, are arranged in one individual cutout 16. The field coils 18 bear in each case against the limb sides of the cutout 16, which is triangular in cross section, on the rotor body 12 and are surrounded at their radially outer end regions by in each case one pole shoe 14. A coil support 22, which is likewise essentially triangular in cross section and by means of which the field coils are retained in the cutout 16, is arranged between the two field coils 18.

Leaf springs 24, which are arranged such that they are evenly distributed over the longitudinal extent of the salient-pole rotor 10, are inserted in the radially inwardly pointing end region of the cutout 16, which is triangular in cross section. These leaf springs are produced from a bent spring steel and have essentially an O shape in the cross-sectional view illustrated in FIG. 1. This O shape is formed by two essentially semi-cylindrical spring arms 26 and 28, between which an opening 30 is located which passes through the O shape. On that side of the O shape of the leaf spring 24 which is diametrically opposite the opening 30, said leaf spring 24 is screwed on to the rotor body 12 using a fixing means 32 in the form of a stud bolt.

In total five leaf springs 24 are arranged distributed evenly over the length of the salient-pole rotor 10. With the aid of these leaf springs 24, the field coils 18 are each forced essentially radially outwards against the associated pole shoe 14, and an axial cooling channel 34 is created by the gap thus produced between the field coils 18 and the rotor body 12, through which cooling channel 34 a cooling medium (generally air) can be introduced for the purpose of cooling the field coils 18 of the salient-pole machine 10. In order to create this cooling channel 34, the O shape of the leaf springs 24 is particularly advantageous since this O shape has a comparatively large through-opening and therefore subjects the cooling medium to comparatively little cooling resistance.

In order that the cooling medium supplied through the axial cooling channel 34 can absorb the heat energy produced at the field coils 18 particularly effectively, the field coils 18 each have a large number of radial cooling channels 36 passing through them, which are formed in the axial direction in particular between in each case two leaf springs 24 in the field coils 18. The radial cooling channels 36 extend, starting from the axial cooling channel 34, through the insulating frame 20 and the associated field coil 18. They lead to associated air outlet openings 38, which pass through the associated pole shoes 14 and lead to the outside of the salient-pole rotor 10. In this manner, the cooling medium supplied through the axial cooling channels 34 can be dissipated through the field coils 18 by means of the radial cooling channels.

The invention claimed is:

1. A salient-pole machine, comprising:
a rotor body that extends in an axial direction of the machine;
a pole shoe arranged on the rotor body and including an air outlet opening;
a field coil arranged between the rotor body and the pole shoe; and
a leaf spring arranged between the field coil and the rotor body that forces the field coil against the pole shoe by exertion of a spring force against the field coil, the spring having a hollow cross section with an interior portion arranged between the field coil and the rotor body,
wherein the spring has an essentially U-shaped cross section having two limblike extensions positioned so that the field coil is forced against the pole shoe by one of the two limbs, wherein the spring is fixed to the rotor body by a fixing device on a side of the O-shaped spring opposite the opening in the spring,
wherein an axis of the spring cross section is parallel to the rotor axis, the interior portion of the hollow spring element forms an axial cooling channel of the machine, the field coil includes a radial cooling channel extending from the axial cooling channel to the air outlet opening, with the radial cooling channel extending radially outward with respect to the axial direction of the rotor body, and
wherein the radial cooling channel is in connection with the axial cooling channel to allow flow of a cooling medium from the axial cooling channel and through the radial cooling channel and through the air outlet opening of the pole shoe.

2. The salient-pole machine as claimed in claim 1, wherein the spring has two essentially U-shaped sections which partially overlap to form essentially an O-shape having an opening at one point.

3. The salient-pole machine as claimed in claim 1, wherein the spring has a spring stiffness of between approximately 1 and 4 N/mm.

4. The salient-pole machine as claimed in claim 3, wherein the spring has a spring stiffness of between approximately 2 and 3 N/mm.

* * * * *